United States Patent
Alessio et al.

(10) Patent No.: US 9,049,223 B2
(45) Date of Patent: Jun. 2, 2015

(54) SYSTEM AND METHOD FOR REMOTE SECURITY MANAGEMENT OF A USER TERMINAL VIA A TRUSTED USER PLATFORM

(75) Inventors: Elisa Alessio, Turin (IT); Luca Pesando, Turin (IT); Davide Pratone, Turin (IT)

(73) Assignee: TELECOM ITALIA S.P.A., Milan (IT)

( * ) Notice: Subject to any disclaimer, the term of this patent is extended or adjusted under 35 U.S.C. 154(b) by 1152 days.

(21) Appl. No.: 11/666,618

(22) PCT Filed: Oct. 29, 2004

(86) PCT No.: PCT/EP2004/052726
§ 371 (c)(1),
(2), (4) Date: Apr. 30, 2007

(87) PCT Pub. No.: WO2006/045343
PCT Pub. Date: May 4, 2006

(65) Prior Publication Data
US 2007/0294744 A1    Dec. 20, 2007

(51) Int. Cl.
*G06F 12/14*     (2006.01)
*H04L 29/06*     (2006.01)
*H04W 88/02*     (2009.01)

(52) U.S. Cl.
CPC .... *H04L 63/1425* (2013.01); *G06F 2221/2153* (2013.01); *H04L 63/20* (2013.01); *H04W 88/02* (2013.01)

(58) Field of Classification Search
None
See application file for complete search history.

(56) References Cited

U.S. PATENT DOCUMENTS 5,145,481 A    9/1992  Friedebach
5,148,481 A *  9/1992  Abraham et al. ............... 380/46
(Continued)

FOREIGN PATENT DOCUMENTS

EP    1 094 682 B1    4/2001
WO   WO 03/065181 A1    8/2003

OTHER PUBLICATIONS

International Search Report issued in corresponding International Patent Application No. PCT/EP2004/052725 on Jul. 22, 2005 (3 pages).
Entry into European Phase before the European Patent Office regarding corresponding European Patent Application No. 047913462.2 dated Mar. 9, 2007 (3 pages).

(Continued)

*Primary Examiner* — Kaveh Abrishamkar
(74) *Attorney, Agent, or Firm* — Finnegan, Henderson, Farabow, Garrett & Dunner, L.L.P.

(57) ABSTRACT

A user system includes terminal equipment configured to receive and send data through a communication network; a terminal security support system removably insertable in, and configured to cooperate with, the terminal equipment; and a trusted user platform for the terminal equipment. The trusted user platform includes an information protection system configured to implement security functionalities, configuration instances for the information protection system, and a trusted communication agent configured to provide a safe communication between the terminal security support system and a remote management centre through the terminal equipment to allow the information protection system to be remotely configured from the remote management centre. The terminal security support system includes an integrated circuit card and/or a memory card which wholly supports the trusted user platform, and the terminal equipment is configured to send data to be subjected to security control to, and to receive security-controlled data from, the trusted user platform.

34 Claims, 7 Drawing Sheets

(56) References Cited

U.S. PATENT DOCUMENTS

| | | | |
|---|---|---|---|
| 7,187,771 B1* | 3/2007 | Dickinson et al. | 380/228 |
| 7,191,288 B2* | 3/2007 | de Jong | 711/115 |
| 2002/0137545 A1 | 9/2002 | Nachef | |
| 2002/0162022 A1 | 10/2002 | Audebert | |
| 2003/0135471 A1* | 7/2003 | Jaquier et al. | 705/67 |
| 2004/0088567 A1 | 5/2004 | Lamotte | |
| 2006/0253900 A1* | 11/2006 | Paddon et al. | 726/11 |

OTHER PUBLICATIONS

Communication Pursuant to Rules 109 and 110 EPC in corresponding European Patent Application No. 047913462.2 dated Jun. 15, 2007 (2 pages).

Communication Pursuant to Article 96(2) EPC in corresponding European Patent Application No. 047913462.2 dated Oct. 22, 2007 (3 pages).

* cited by examiner

SYSTEM AND METHOD FOR REMOTE SECURITY MANAGEMENT OF A USER TERMINAL VIA A TRUSTED USER PLATFORM

CROSS REFERENCE TO RELATED APPLICATION

This application is a national phase application based on PCT/EP2004/052726, filed Oct. 29, 2004, the content of which is incorporated herein by reference.

Page 5, lines 30-33, cancel the paragraph in its entirety and substitute two (2) paragraphs therefor as follows:

This aim is achieved by the present invention in that it relates to a user system including:
- a terminal equipment (TE) configured to receive and send data through a communication network (CN),
- a terminal security support system (TSSS) removably insertable in, and configured to cooperate with said terminal equipment (TE); and
- a trusted user platform (TUP) for said terminal equipment (TE), and including:
  - an information protection system (IPS) configured to implement security functionalities, and
  - configuration instances (CI) for said information protection system (IPS), characterized in that:
  - said trusted user platform (TUP) is resident on said terminal security support system (TSSS), and
  - said terminal equipment (TE) is configured to send data to be subjected to security control to, and to receive security-controlled data from said trusted user platform (TUP).

The aim of the present invention is also achieved by a method for supporting security in a user system wherein said terminal security support system (TSSS) includes a first card (ICC) and a second card (MC), and a trusted user platform (TUP) is partitioned between said first and second cards (ICC, MC), and wherein said first and second cards are an integrated circuit card (ICC) and a memory card (MC), and further including:
- a card link application (MC_Link) provided in one of said integrated circuit card (ICC) and said memory card (MC) to establish and manage a secure logical connection between said integrated circuit card (ICC) and said memory card (MC) through said terminal equipment (TE1), and
- an application programming interface (MC_Link_API_1) provided in said terminal equipment (TE) to receive and execute commands from said card link application (MC_Link), and to cooperate with said card link application (MC_Link) to establish said secure logical connection between said integrated circuit card (ICC) and said memory card (MC) through said terminal equipment (TE1).

TECHNICAL FIELD OF THE INVENTION

The present invention relates in general to mobile and fixed communications, and in particular to support, implementation and management of information security in a user terminal equipment. More specifically, the present invention relates to a user terminal equipment with a trusted user platform which allows the user to safely access added-value services through a data communications network.

BACKGROUND ART

As is known, services supported by the next generation user terminal equipments, such as personal digital assistants, smart phones or laptops connected to wireless local area networks (WLAN), allow users to access high value-added contents in the network and also to exchange sensitive information in commercial transactions and in many other applications now accessible to mobile users.

These enhanced functionalities require a careful consideration of security aspects for protecting both the terminal equipment and the communication channel. This protection has to be provided by means of the elements usually available in the terminal equipment, i.e. the terminal equipment itself, an integrated circuit card, such as the subscriber identity module (SIM) card, and a memory card, such as a multimedia card or a secure digital™ card.

Several examples exist of integration of functionalities supported partly on the terminal equipment and partly on the integrated circuit card for implementing security applications, such as virtual private networks based on various technologies and protection of end-to-end communications by security session layer protocol. These methods allow secrecy by the encryption of exchanged data and the authentication of the counterparts, besides that of the data itself.

EP-A-1 094 682 discloses a mobile phone incorporating security firmware and a method for transmitting data packets in a communication system including a remote host (laptop, stand alone computer, or personal digital assistant), an independent access unit, and a receiving computer acting as a security gateway to an Intranet, wherein security firmware, in the form of IPsec (IP security protocol) or software, is located inside the independent access unit, and the independent access unit is used as a security gateway between the remote host and the Intranet in order to provide security in the communication to the remote host when the communication is performed over the Internet. The communication between the independent access unit and the remote host is performed by means of a wireless connection, and client private information required per client authentication are stored in a personal tamperproof storage in the form of a SIM card/smart card, and used in combination with the independent access unit as a security gateway upon establishment of a IPsec tunnel. The solution of moving the security function to the mobile telephone or the independent access unit, preferably a wireless independent access unit, where a lightweight security gateway or firewall is implemented, enables a user to borrow any remote host in order to access the Intranet by means of a mobile communication network or a fix network, e.g. PSTN. In this way, an employee staying away from his ordinary office may, by means of a personal independent access unit functioning as a security gateway, communicate with the protected Intranet of his employer.

WO-A-03/065181 discloses a method for controlling the use of digital contents by means of a security module or a chipcard comprising the security module, wherein any use of digital content is protected by an initial verification before any access of two types of access, the authorization of the user himself and the authorization associated with the digital content. The authorizations are stored on a security module provided for authorized users and controlled by the user security module. At least a private section of a digital content is stored in the security module and transmitted to the terminal after authorization. The solution disclosed in this document finds application in the field of electronic commerce essentially concerning the management of digital authorization for use of digital contents.

However, the support of virtual private networks does not protect from attacks directed against the terminal equipment that can exploit code downloads during web surfing and results in uncontrolled storage or even execution of malicious code. The use of an embedded firewall proves to be a strong prevention from dangerous user's behavior and external attacks. The firewall must be statefull and be able to track terminal equipment's activities during time.

In order to assure the effectiveness of a firewall protection, security policies should be configured and updated to protect data from unauthorized access and to minimize user's vulnerability to attacks from shared networks.

Key firewall features are:
rule-based packet filtering to provide an easily configurable system for multiple levels of protection against attacks;
automatic security policy download and update to make security transparent to the user;
easy-to-use application to define security policies and deploy security rules to the user terminal equipment;
scalable collection, consolidation, and reporting of security logs;
fine-grained security controls to enable protections against specific types of attacks;
device-level integrity monitoring to detect intentional tampering, accidental modifications and introduction of malicious code that could alter system files, file attributes, or registry entries.

Moreover, the security level provided by a firewall can be further improved by adding:
an antivirus to detect malicious code/files with dangerous content to be stored and/or run on the user terminal;
an intrusion detection system to protect the user terminal against complex attacks.

Implementing the above-described functionalities requires the availability of enough memory and computational power in the user terminal equipment. For instance, in a common approach, when encryption is needed the central processing unit of the terminal equipment fetches user's certificates and secret keys stored on the integrated circuit card, and performs the intensive computation based upon them. For instance, in a mobile terminal equipment, memory and cycles of the central processing unit are precious resources and adding to the system the security functionalities just described can spoil the performance for the network services accessed by the user. In order to make it interesting for mobile applications, a strong requirement for a security technology is therefore to overcome these drawbacks, that is to be light enough not to impact the performances of the system for other functions. In fact, having a security engine (including firewall, antivirus, and intrusion detection system functionalities) inside a user terminal equipment brings requirements in terms of how to manage it in a secure, automatic and easy way: finding a suitable mechanism to do this from remotely becomes an essential point not to make the security tools an issue to the user. So these tools should require very little effort and expertise of the user, and, on the other hand, it should be possible for a service provider or a corporate service manager to manage the security remotely in a guaranteed and controlled manner, offering turn-key solutions. Moreover, the configuration data can include sensitive information, such as personal keys for encryption, passwords, etc., and storing them in a safe location becomes a stronger requirement as the spectrum and range of the applications accessible become wider, in order to protect both the user and the provider or corporate network. Protection/prevention against the theft of the user terminal is therefore a relevant issue.

OBJECT AND SUMMARY OF THE INVENTION

The aim of the present invention is to provide a trusted user platform for a user terminal equipment which overcomes the aforementioned drawbacks.

This aim is achieved by the present invention in that it relates to a user system, as defined in claim 1, and to a method for supporting security in a user system, as defined in claim 14.

The present invention meets the aforementioned needs as it makes use of a distributed architecture for the security system, which distributed architecture is based upon the use of an integrated circuit card, such as the SIM card of a mobile phone, and/or a memory card, which can be for instance a multimedia card, a secure digital™ input/output card or any other kind of memory cards used, where all the operation phases needed for security functions are performed and relative data and configuration parameters stored.

In this distributed architecture the terminal equipment is not required to perform tasks other than providing a connection towards the network and between the other elements by which the security architecture is composed. In this approach the terminal equipment's resources are still in large part available for high valued applications accessed by the user, while security relies on the additional elements of the user system, namely the integrated circuit card and the memory card.

In this way, the terminal equipment is offloaded and the security support becomes independent of the specific terminal equipment.

This terminal-independent, distributed architecture is suitable for a service provider environment in which a service provider/enterprise would like to provide an integrated solution of security services to its customers/employees, since the SIM card (or the integrated circuit card) is usually controlled by the operator. Storing these sensitive data on a removable support that the user can easily and safely take with himself/herself represents an optimal solution to the problem of possible theft of the terminal with consequent loss of sensitive information. In this way, in fact, a trusted environment is created at the user platform layer, allowing to store locally and securely the sensitive configuration parameters (including passwords, keys, etc.) obtained from the service provider.

BRIEF DESCRIPTION OF THE DRAWINGS

For a better understanding of the present invention, a preferred embodiment, which is intended purely as an example and is not to be construed as limiting, will now be described with reference to the attached drawings, wherein.

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein and defined in the attached claims.

Figure 1:
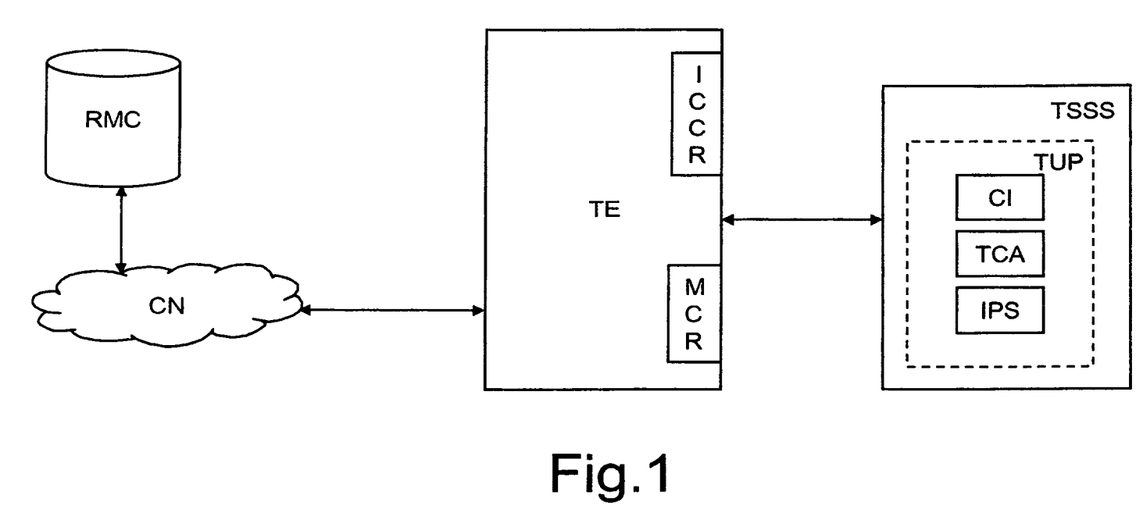
FIG. 1 shows the principle of the present invention.

FIG. 1 schematically shows a user system including:
- a terminal equipment (TE), such as a smart phone, a personal digital assistant, an access gateway, a digital camera, etc., configured to receive and send data through a communication network (CN), and provided with an integrated circuit card reader (ICCR) and a memory card reader (MCR);
- a terminal security support system (TSSS) separate from, and configured to cooperate with the terminal equipment and physically made up of:
  - an integrated circuit card (ICC), such as a smart card, a subscriber identity module (SIM) card, a USIM (UMTS SIM) card, and/or
  - a memory card (MC), e.g., a multimedia card, or
  - a secure digital™ input/output card, and
- a trusted user platform (TUP) wholly resident on the terminal security support system and including:
  - an information protection system (IPS),
  - configuration instances (CI) for the information protection system, and
  - a trusted communication agent (TCA) for communication with a remote management centre (RMC), typically centralized, which allows the operator or service provider to configure and manage the service, according to the individual service profiles, for a variety of users.

The information protection system has specific security functionalities and performs the proper data processing (both for data flow and stored data) according to the configuration instances that are locally stored and tightly coupled with the security functionalities.

In particular, the information protection system may include both software and hardware modules which implement engines for the following functionalities:
- a firewall (FW) that analyses an information flow and, according to a set of configured rules, allows or denies a packet of data,
- an antivirus (AV) that detects and protects against viruses based on a specific database of virus footprints, and
- an intrusion detection system (IDS) that detects specific attacks based on a database of known malicious signatures and on the state analysis of network activity.

This approach allows the service provider to offer a turn-key, robust security support to the customers thanks to the possibility, besides that of providing a safe repository on the cards for the personal certificates and security policies, of configuring the firewall remotely from the remote management centre and providing periodic updates according to the subscribed service level agreement (SLA).

The trusted communication agent is an application which performs the following operations:
- provides a secure connection between the terminal security support system and the remote management centre for data exchange,
- provides the configuration instances and the required updates to the information protection system for the configuration of the information protection system itself and the updates of locally stored security policies and databases; and
- sends back to the remote management centre event notifications such as security logs, warnings and alarms.

A data-exchange mechanism between the trusted communication agent and the remote management centre must be available for downloading the configuration instances and the updates of locally stored security policies and databases, and uploading the logs for off-line processing and statistics collection. This relies on the operation of the trusted communication agent and will be described in the following.

The invention does not address a single technology for the interworking with the terminal security support system and relies on the possibility of establishing a direct logical communication between it and the provider's remote management centre. Therefore, the invention can be supported by any available technology for the communication between the involved parts, i.e. the remote management centre and the terminal security support system, and it is therefore bearer-independent because the bearer is provided by the terminal equipment. The communication mechanism grants the link security performing the mutual authentication with the other entity (remote management centre and terminal equipment), optionally encrypting the data exchanged and performing the data integrity check.

The communication mechanism between the terminal security support system and the remote management centre can be wireless, e.g. short message service (SMS), or wireline, e.g. Internet protocol (IP), and grants the link security performing the mutual authentication with the other entity, optionally encrypting the data exchanged and performing the data integrity check. The configuration instances are provided and updated through the connection to the remote management centre that prepares, coordinates and sends them to the trusted communication agent, which transfers them to the information protection system in the appropriate format. The latter generates logs, alarms, warnings and event notifications that are sent back to the remote management centre through the trusted communication agent, in order to allow remote monitoring and to allow complex attack identification.

In particular, the configuration instances include the following configuration parameters, security policies and databases for the information protection system:
- configuration parameters and security policies (for the firewall),
- configuration parameters and virus-footprints database (for the antivirus), and
- configuration parameters and malicious pattern database (for the intrusion detection system).

The configuration instances are downloaded from the remote management centre through the trusted communication agent and stored in the following files:
- OFC: it contains the operator firewall configuration,
- OFR: it contains the operator firewall rules,
- UFR: it contains the user firewall rules,
- AVC: it contains the antivirus configuration,
- AVD: it contains the antivirus database,
- AVU: it contains the antivirus update,
- IDC: it contains the intrusion detection configuration,
- IDD: it contains the intrusion detection database, and
- IDU: it contains the intrusion detection database update.

The user can manage only the file UFR, whereas all the other files are under the control of the service provider.

There is not need to implement any user configurable rules for the antivirus and intrusion detection system agents, as these engines rely on information commonly not accessible to the user.

The trusted communication agent uses other elementary files to store the event notification, warning and alarms generated by the information protection system. When one of these events occurs, the terminal equipment writes it in the appropriate file. The trusted communication agent processes the event and sends a message containing the event record to the remote management centre, which processes the message and decides the appropriate action to be taken (e.g. simply log the event or notify an attack and take countermeasures to block it).

In the previously described architecture, all the security functionalities are performed on the terminal security support system, which also stores relative data and configuration parameters and eventually returns the checked data to the terminal equipment for user application processing and/or transmission by the network interface. Therefore, the terminal equipment simply acts as a link towards the remote management centre and the terminal security support system and between the information protection system and configuration instances. The information protection system performs all the security functionalities and retrieves the required configuration instances, the last updates, and policies/databases/tables for firewall, antivirus and intrusion detection system using the trusted communication agent trusted communication agent.

The network drivers running on the terminal equipment must be such as to allow capturing the information flow and addressing it to the trusted user platform on the terminal security support system. After accomplishing its security tasks, the trusted user platform returns the checked data back to the drivers in the terminal equipment in a similar way. In a similar way, all packets in a data stream originated in the UT are sent to the trusted user platform for firewall rule application and, only after the terminal equipment gets them back from the trusted user platform, the checked packets are sent to the network.

As this is attainable with the state of the art card and processor technology, the requirement will not be pointed out anymore in the following.

The terminal security support system is preferably based upon the use of user-removable cards, although the concepts here expressed can be applied also to a context in which one or both the cards are hard-wired and physically inaccessible to the user.

The three entities which form the trusted user platform, i.e., information protection system, configuration instances and trusted communication agent, and which are resident on the terminal security support system, may be partitioned between the two cards forming the terminal security support system, i.e., the integrated circuit card and the memory card, or located on either of them according to optimization requirements.

Figure 3:
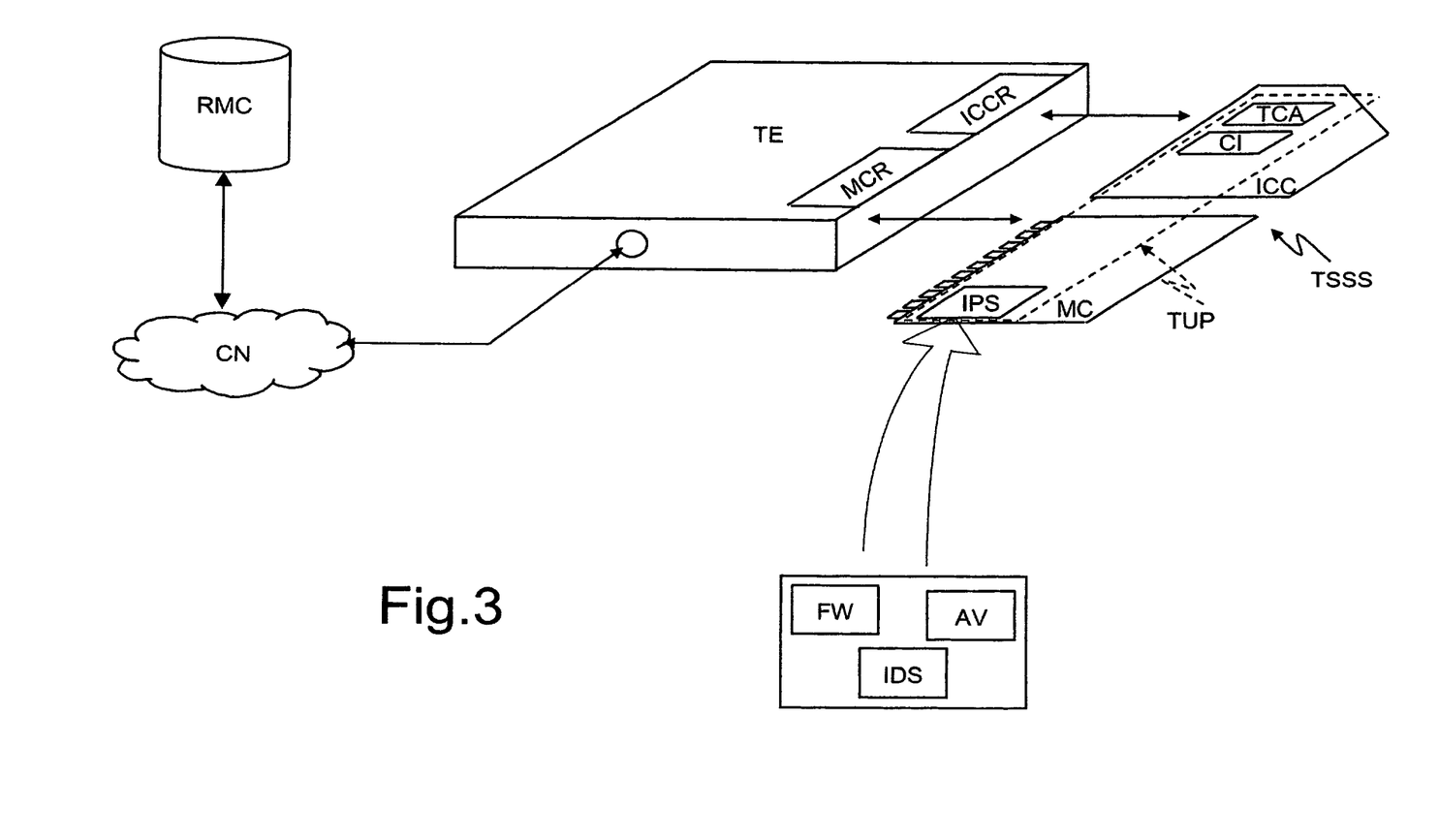
Figure 4:
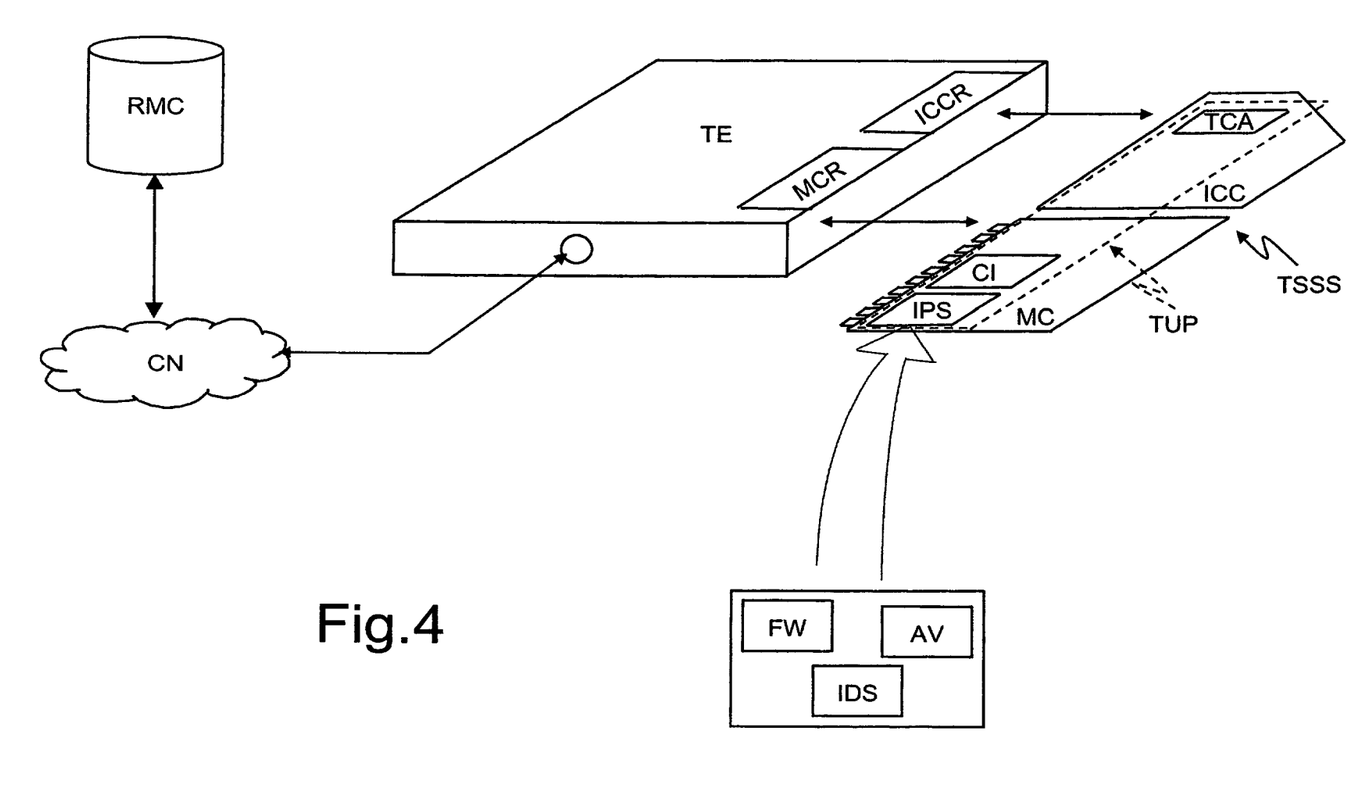
Figure 5:
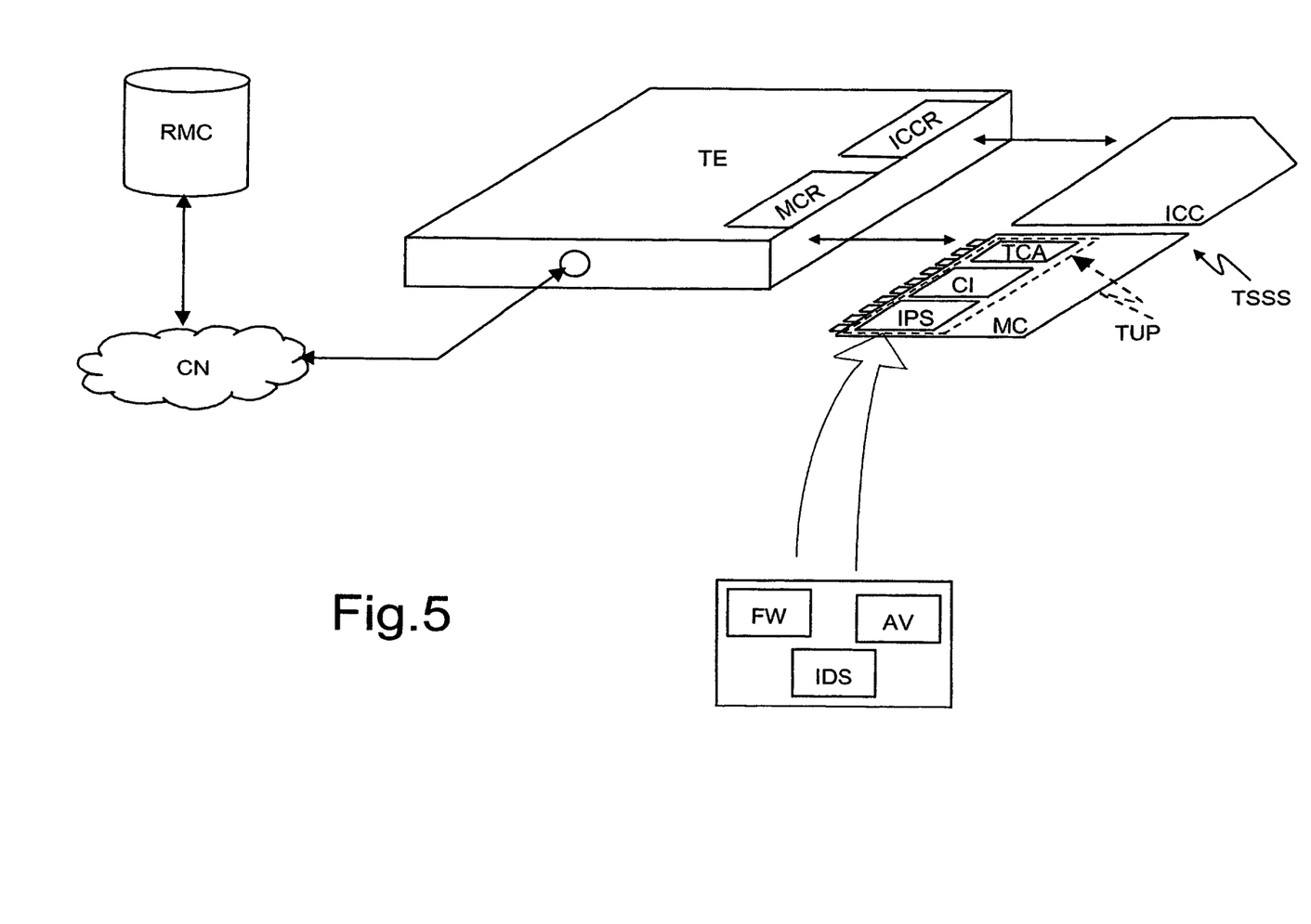

FIGS. 2 to 5 show how the information protection system, configuration instances and trusted communication agent may be partitioned between the integrated circuit card and the memory card. In particular, FIGS. 2 to 5 represent some of the possible solutions for the functional splitting that are of relevance for a terminal security application, including also the two embodiments in which the terminal security support system is made up of the integrated circuit card only (FIG. 2) and of the memory card only (FIG. 5).

Figure 2:
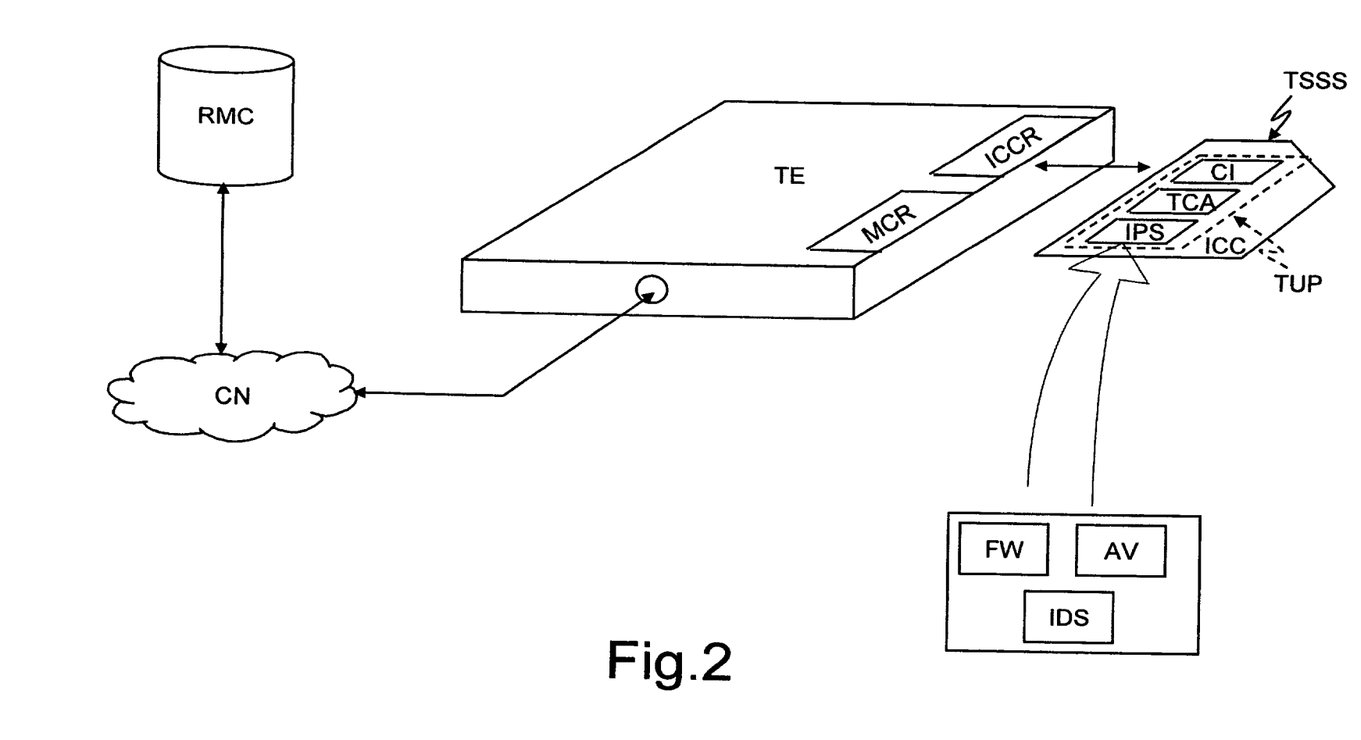
FIGS. 2 to 5 show different embodiments of the present invention.

In particular, in the embodiment shown in FIG. 2, the terminal security support system includes only the integrated circuit card, and the trusted user platform is wholly supported by the integrated circuit card. In this embodiment, the memory card, possibly in use in the terminal equipment, is not involved in security functionalities and hence it is not part of the terminal security support system.

In the embodiment shown in FIG. 3, the terminal security support system includes both the integrated circuit card and the memory card, and the information protection system is on the memory card, which has a central processing unit and possibly an hardware engine, while the configuration instances and the trusted communication agent are on the integrated circuit card. The use of the configuration instances by the information protection system is made possible through the terminal equipment, which simply acts as a physical support for the communication, by the mechanism described hereinafter.

In the embodiment shown in FIG. 4, the configuration instances and the information protection system are on the memory card, while the trusted communication agent is on the integrated circuit card and allows controlling and configuring the configuration instances and the information protection system through the terminal equipment.

In the embodiment shown in FIG. 5, finally, the information protection system, the configuration instances and the trusted communication agent are on the memory card, which completely covers the functionalities related to security. The integrated circuit card is shown in FIG. 5 because, both in a removable fashion or hard-wired, it is in principle needed for the access to network services. In this embodiment, the integrated circuit card is not involved in security functionalities and hence it is not part of the terminal security support system.

Further comments on the possible partitioning of the trusted user platform will be given in the following sections through some examples.

Described hereinafter are three examples of how the embodiments shown in FIGS. 2, 4 and 5 may be reduced to practice.

In particular, the embodiment shown in FIG. 2 may conveniently be used as a firewall support scheme, wherein the terminal equipment is a mobile phone, the terminal security support system is made up of a SIM card only (ICC), the trusted user platform (information protection system, configuration instances and trusted communication agent) is fully supported by the SIM card, the information protection system is made up of a firewall only, and the remote management centre is a provider's SIM toolkit (STK) server.

In this example, the users are provided with a turn-key firewall configuration of which the provider takes care and grants periodical updates thanks to an over the air (OTA) interface, which supports the communication between the provider's central office and the SIM card. The mobile phone simply gives the physical connection (radio carrier) with the network from the point of view of security. The mobile phone can support a pool of high-level content services, but it is not involved in the firewall support. Firewall operations are supported totally on the SIM card. The firewall can in principle be hardware and/or software.

At power-up, the information protection system running on the central processing unit of the SIM card retrieves the configuration data and the rules from the configuration instances in the SIM card, and, after that, it configures the firewall, thus making it ready for operation. When a new update of the configuration instances is available from the remote management centre, the trusted communication agent receives it from the over the air interface, converts the data in the firewall rule table format (because the data on the SIM card are coded in tag length value (TLV) format), updates the configuration instances, as described hereinafter, and warns the firewall, which reads the new configuration instances. The SIM card contains two files managed by the operator, namely the OFC and the OFR, in order to allow the operator to define the firewall configuration and rules, and a file managed by the user, namely the file UFR, in order to allow the user to define his own rules. The operator access condition both for the files OFC and the OFR must be "administrator" (ADM).

The following is an indicative list of firewall configuration parameters:

maximum number of rules in the operator firewall table; maximum number of rules in the user firewall table; and frequency of logs.

This is only one of the possible sets of configuration parameters. Different sets are in principle equivalent and may differ in the type of service and the level of control the operator wants to have on the security of the mobile phone.

A general firewall rule can be defined by means of the following fields:

rule ID;
direction (in/out)
source
destination
service (e.g., file transfer protocol—FTP)
protocol (e.g., transmission control protocol—TCP)
action (e.g., allow, deny)
log (e.g., detailed)
time (e.g., always on)

The last two fields can be optional, whereas the others are usually required. This list has to be considered as an instance among the various possible implementations and the addition of one or more fields for new possible filtering functionalities is possible, as well as the use of a sub-set of the listed fields. This also gives the flexibility to adapt it to new applications and protocols requirements.

When the SIM card does not have all the required memory resources, for instance because the size of the configuration database is too large, it can be convenient to adopt the embodiment shown in FIG. 4, wherein the terminal security support system is made up of both a SIM card (ICC) and a memory card, and the trusted user platform is partitioned between the SIM card and the memory card, in particular the information protection system (firewall, antivirus and intrusion detection system) and the configuration instances are on the memory card and the trusted communication agent is on the SIM card.

The memory card supports part of the security functionalities and the presence of the trusted communication agent on the SIM card optimizes the control of the security applications done by the same service provider that also gives access to the network. The configuration data are downloaded in the memory card via the over the air interface thanks to the previously described procedure and communication protocols, that allow opening a secure logical channel between the memory card and the SIM card. At power-up, the information protection system running on the central processing unit of the SIM card retrieves the configuration data for all the functionalities supported by the information protection system and the firewall rules from the configuration instances in the memory card. When a new update of the configuration instances is available from the remote management centre, the trusted communication agent receives it from the Over The Air interface, converts the data in the rule table format of each engine in the information protection system, updates the configuration instances, as described hereinafter, and warns the engines, which read the new configuration instances.

The configuration instances for the firewall have the same structure and characteristics as those previously described with reference to the previous example, and also the management procedures are exactly the same, with the only variation that in this embodiment the trusted communication agent interacts with the configuration instances and the engines in the information protection system through the interfaces that connect the memory card and the SIM card to the terminal equipment, which provides the physical interconnection.

The service supporting antivirus, content filtering or intrusion detection system is in many aspects the same, and is in any case similar to the one previously described with reference to the firewall. In this embodiment, there is not a rule-based filtering, but a filtering based on known strings, which can be virus footprints, specific uniform resource locators (URLs), generic data patterns or malicious strings to be identified in the packet payload. In all these applications, the strings to be searched for are stored in specific databases. As the complete size of the databases can be quite large, they can be stored more easily on the memory card, but the updates to these files are at first downloaded into the SIM card using an over the air bearer (if the file dimension is limited it is also possible to download the complete file). As an example, a detailed description may be given of what happens for the antivirus functionality. Thanks to the mechanism described hereinafter, the trusted communication agent running on the central processing unit of the SIM card stores the antivirus update file in the memory card, updating the Virus List. In this way, when the trusted communication agent receives, for instance, an SMS with the antivirus Update, it changes the corresponding file.

Analogous considerations may be made for the intrusion detection system, URL filtering or a generic content filtering application, in which the database of the virus footprints is substituted with a file of appropriate patterns. For optimizations purposes, antivirus and content filtering update files can be written into the same memory area on the SIM card, using a proper mechanism to avoid conflicts.

To support this with present wireless technology, applets are required. The SIM toolkit applet on the SIM card must be able to download periodically the data-pattern updates OTA and correspondingly reconfigure the configuration instances and the engines. The applet must also resize the file AVU, which contains the antivirus configuration modifiable by the operator only, in order to adapt it to the new dimension and delete the old file before downloading the new one. A mechanism must be provided to ensure that this happens only after full completion of the previous update. In case the user wants to download a complete database, then the opportunity of doing it over the air rather than by other means (e.g. PC intermediation) depends on the available bandwidth for the used wireless transport. The operator access condition for the file AVU must be "administrator" (ADM).

The following is a possible list of antivirus configuration parameters:

maximum number of virus patterns,
frequency of logs and alarms, and
antivirus activation rules.

The embodiment shown in FIG. 5, wherein the terminal security support system is made up of a memory card only which fully supports the trusted user platform (information protection system, configuration instances and trusted communication agent) is of a particular interest for example for a company willing to provide to its corporate users a communication protection system controlled and managed centrally by the company itself, while still relying on a service provider/operator for the general access and network services.

This scheme requires that the memory card be equipped with all the needed processing resources, i.e., memory and Central Processing Unit, and the secure digital™ input/output cards presently available on the market meet these requirements. The scheme also includes an integrated circuit card which performs functions other than security, such as enabling access of the terminal to the network.

In this embodiment, when the configuration data are received from the remote management centre, they are delivered to the trusted communication agent on the memory card through a logical channel opened between the remote management centre and the memory card. From then on, the whole process is handled in the same way as that previously described, with the only difference that all the interacting entities run on the central processing unit of the memory card and exploit its memory resources. In this embodiment, the communication flow has to be by default directed to the memory card before being delivered to any other elements in the system for execution or storage, in order to have it analyzed by the firewall. This can be done by means of appropriate network drivers as already mentioned before.

As previously mentioned, implementation of the configuration instances requires that the terminal equipment provides direct access to the data stream by either the memory card or the integrated circuit card, or both. A communication mechanism must therefore be provided in order to make the integrated circuit card and the memory card communicate with each other when both are involved.

Figure 6:
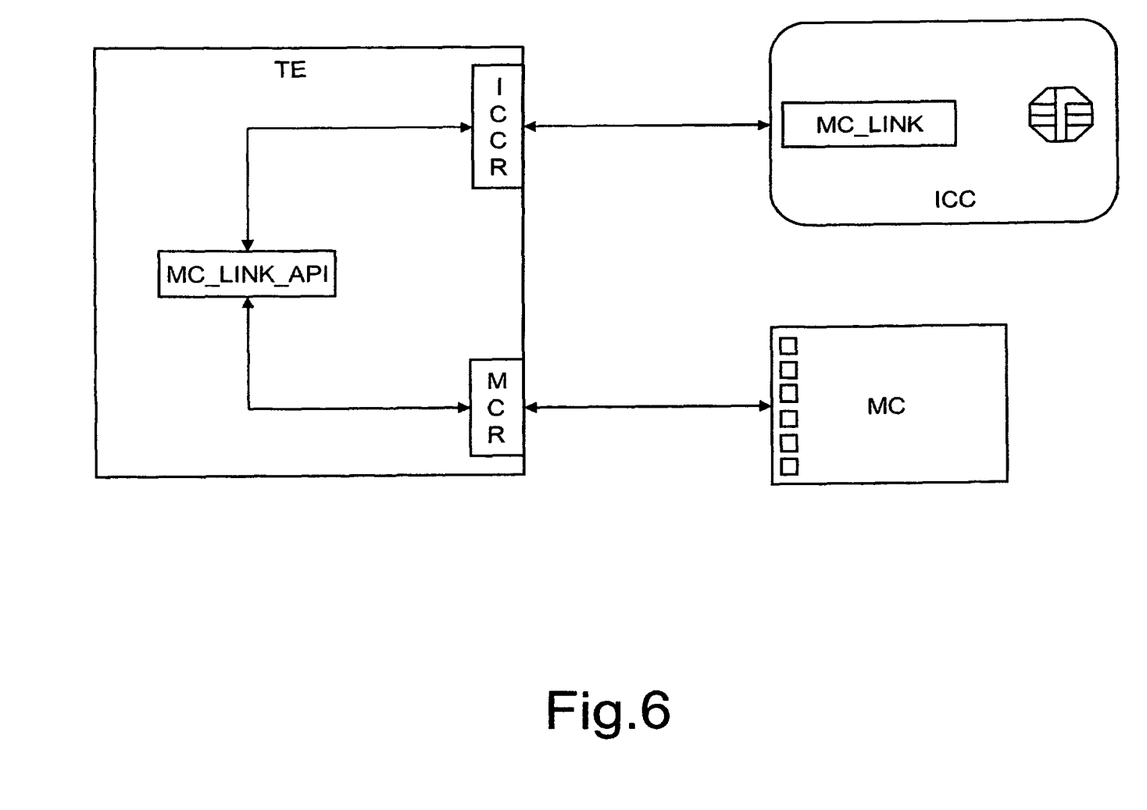
FIG. 6 shows a block diagram of a communication mechanism which allows an integrated circuit card to communicate with a memory card.

To do so, as shown in FIG. 6 the user system further includes a card link application, hereinafter referred to as MC_Link, which is a software module stored in and running on the integrated circuit card (ICC) and having the aim to set up and manage a secure logical connection between the integrated circuit card and the memory card (MC), and an application programming interface, hereinafter referred to as MC_Link_API, which is a software stored in and running on the terminal equipment (TE) and having the aim to interpret the MC_Link requests and to adapt and/or forward the data which comes from the integrated circuit card to the memory card interface and vice versa. In particular, in the former case (adaptation and forwarding), the MC_Link sends to the MC_Link_API the instruction for the memory card, and the MC_Link_API codes the instruction in the memory card protocol, whereas in the latter case (only forwarding) the MC_Link sends to the MC_Link_API the command for the memory card, and the MC_Link API forwards the command without change its coding.

The MC_Link provides the other software applications running on the integrated circuit card with a protocol to interact with the memory card. In particular, the MC_Link provides the other applications with the following functions:

"Read Data": this function is used to read data from the memory card;

"Read Cipher Data": this function is used to read and decipher data from the memory card;

"Write Data": this function is used to write data in the memory card;

"Write Cipher Data": this function is used to cipher and write data in the memory card;

"Erase Data": this function is used to erase data from the memory card; and

"Execute Command": this function is used to perform commands on the memory card.

The algorithm used to cipher and decipher data depends on the implementation of the MC_Link, and for example my be a DES or 3DES algorithm or a proprietary algorithm.

In addition, the MC_Link exchange data and commands with the MC_Link_API in order to reach the memory card on the terminal equipment. In particular, the MC_Link performs the following functions:

"Get Terminal Capabilities": this function is used to provide the integrated circuit card with information about the terminal equipment capabilities in relation to the memory card. In particular, this function informs the integrated circuit card if:

the terminal equipment has one or more memory card readers;

a memory card is inserted into a memory card reader; and a memory card has been inserted.

In response to the command, the MC_Link_API checks the status of the memory card reader(s) and sends the information to the integrated circuit card.

"Open MC": this function is used to open a logical channel between the integrated circuit card and a memory card and to retrieve the information on the availability of a memory card. This function also provides the terminal equipment with the memory card Reader number that the integrated circuit card wants to reach. In response to the command, the MC_Link_API takes the control of the memory card and reserves it for the integrated circuit card needs.

"Close MC": this function is used to close a logical channel between the integrated circuit card and the memory card. In response to the command, the MC_Link_API releases the control of the memory card.

"Get MC Capabilities": this function is used to provide the integrated circuit card with information about the memory card capabilities, and in particular:

the memory card type;
the memory card size;
the memory card available memory;
the memory card identification; and
the memory card security capabilities.

In response to the command, the MC_Link_API checks the memory card capabilities in terms of memory size, file system, security and sends the information to the integrated circuit card;

"Perform MC Command": this function is used to execute commands and receive corresponding responses from the memory card. The commands depend from memory card capabilities and may be the following (others could be added depending on the type of memory card used):

Basic Commands
  RESET
  ASK MC IDENTIFICATION
  SET MC PARAMETER
  SELECT
  SEND STATUS
  INACTIVE MC Read, Write and Erase Commands
  SET BLOCK LENGTH
  READ BLOCK
  READ MULTIPLE BLOCK
  WRITE BLOCK
  WRITE MULTIPLE BLOCK
  EREASE
  EREASE BLOCK Security-related Commands
  LOCK/UNLOCK
  VERIFY PIN
  VERIFY CERTIFICATE
  SET KEY
  SET CERTIFICATE
  SEND KEY
  SEND CERTIFICATE Upon receiving a command, the MC_Link_API interprets and executes it, receives the memory card response relating to the execution of the command and sends it to the integrated circuit card. The MC_Link_API also manages errors reported by memory card and sends them to the integrated circuit card.

Figure 7:
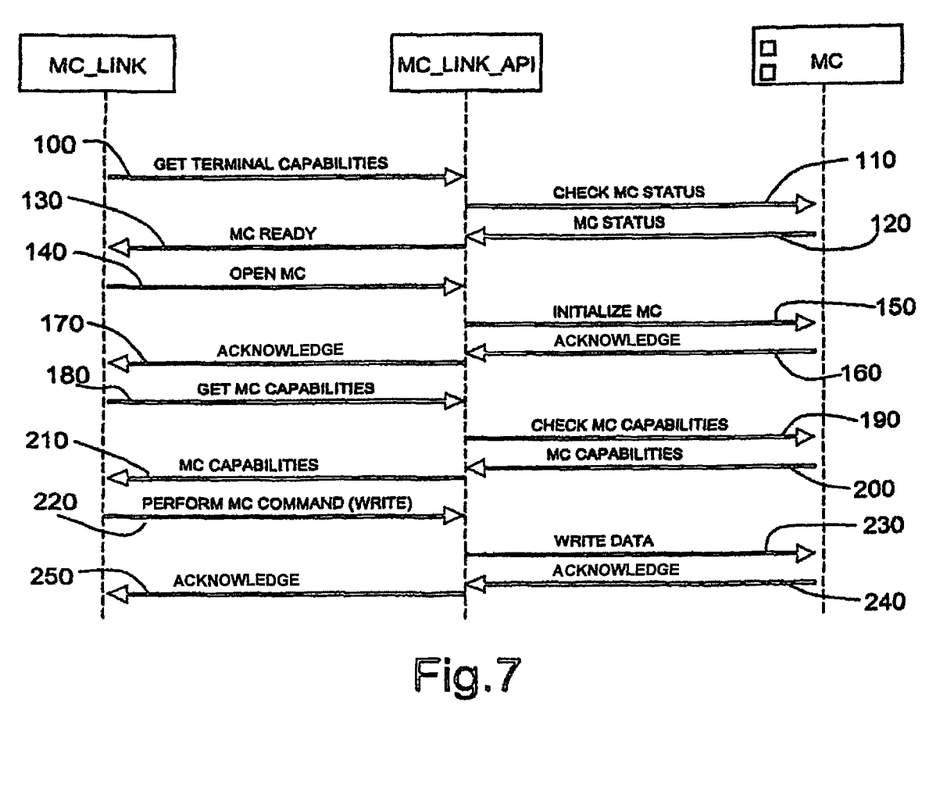
FIG. 7 shows a flowchart of the operations carried out during writing of a memory card.

FIG. 7 shows the commands and responses exchanged between the MC_Link and the MC_Link_API during writing of data in the memory card.

In particular:

the MC_Link sends the command "Get Terminal Capabilities" to the MC_Link API (arrow 100), which checks the memory card status (arrows 110 and 120), and sends to the MC_Link the response "MC Ready" (arrow 130);

the MC_Link then sends to the MC_Link_API the command "Open MC" (arrow 140), which initializes the memory card (arrows 150 and 160), and sends to the MC_Link the response "ACK" (arrow 170);

the MC_Link then sends the command "Get MC Capabilities" to the MC_Link_API (arrow 180), which retrieves the memory card capabilities (arrows 190 and 200), and sends the information to the MC_Link (arrow 210);

the MC_Link then sends the command "Write (data)" to the MC_Link API (arrow 220), which writes the data in the memory card (arrows 230 and 240), and sends to the MC_Link the response "ACK" (arrow 250).

The cases related to the other memory card commands are similar to that previously described, the only difference lying in the memory card command sent by the MC_Link to the MC_Link_API within the "Perform MC Command".

What has been previously described with reference to FIGS. 6 and 7 also applies to scenarios where the memory card is the master and the integrated circuit card is the slave, i.e., where the MC_Link runs on the memory card. To do so, the memory card has necessarily to be of the type with a microprocessor. Practical examples of these scenarios may be an application running on the memory card which wants to update some data and needs to be connected with a remote server. In this scenario, the memory card asks the SIM card to set up a connection over the air with the remote server in order to retrieve the data, and after the memory card reads the data on the SIM card.

Finally, it is clear that numerous modifications and variants can be made to the present invention, all falling within the scope of the invention, as defined in the appended claims.

The invention claimed is:

1. A user system comprising:
    a terminal equipment configured to receive and send data through a communication network;
    a terminal security support system insertable in, and configured to cooperate with, said terminal equipment, wherein the terminal security support system comprises a first card and a second card; and
    a trusted user platform being resident on said terminal security support system, the trusted user platform comprising:
        an information protection system configured to perform security processes to protect from attacks against the terminal equipment; and
        a memory configured to store configuration instances for said information protection system;
    wherein the trusted user platform is partitioned between the first card and the second card; and
    wherein said terminal equipment is configured to send at least one of data received from the network and data to be transmitted over the network to the trusted user platform for security processing and is further configured to receive security-processed data from the trusted user platform.

2. The user system as claimed in claim 1, wherein said trusted user platform further comprises:
    a trusted communication agent configured to provide a safe communication between said terminal-security support system and a remote management centre through said terminal equipment to allow said information protection system to be remotely configured from said remote management centre.

3. The user system as claimed in claim 1, wherein said first and second cards are an integrated circuit card and a memory card.

4. The user system as claimed in claim 3, wherein said information protection system is on said memory card, and said configuration instances and said trusted communication agent are on said integrated circuit card.

5. The user system as claimed in claim 3, wherein said information protection system and said configuration instances are on said memory card and said trusted communication agent is on said integrated circuit card.

6. The user system as claimed in claim 1, wherein said configuration instances comprise configuration parameters, security policies and databases.

7. The user system as claimed in claim 1, wherein said information protection system comprises:
    a firewall configured to analyze an information flow and, according to configured rules, to allow or deny data packets,
    an antivirus configured to detect and protect against viruses based on a specific database of virus footprints, and
    an intrusion detection system configured to detect specific attacks based on a pattern database.

8. The user system as claimed in claim 7, wherein said configuration instances comprise:
    configuration parameters and security policies for said firewall;
    configuration parameters and virus-footprints database for said antivirus; and
    configuration parameters and attack pattern database for said intrusion detection system.

9. The user system as claimed in claim 1, wherein said trusted communication agent is configured to allow said information protection system to receive said configuration instances and updates of said configuration instances from a remote management centre and to send back to said remote management centre event notifications, logs, warnings or alarms.

10. The user system according to claim 3, further comprising:
    a card link application provided in one of said integrated circuit card or said memory card to establish and manage a secure logical connection between said integrated circuit card and said memory card through said terminal equipment; and
    an application programming interface provided in said terminal equipment to receive and execute commands from said card link application and to cooperate with said card link application to establish said secure logical connection between said integrated circuit card and said memory card through said terminal equipment.

11. The user system as claimed in claim 10, wherein said application programming interface is further configured to receive and send responses to said card link application.

12. The user system as claimed in claim 10, wherein said card link application is provided in said integrated circuit card.

13. The user system as claimed in claim 1, wherein said terminal equipment is a mobile phone and said first card is a subscriber identity module card.

14. The user system as claimed in claim 1, wherein the security processes comprise at least one of i) a firewall process configured to analyze an information flow to allow or deny data packets; ii) an antivirus process configured to detect and protect against viruses; and iii) an intrusion detection process configured to detect attacks.

15. A method for supporting security in a user system, the user system comprising:
a terminal equipment configured to receive and send data through a communication network;
a terminal security support system insertable in, and configured to cooperate with, said terminal equipment, wherein the terminal security support system comprises a first card and a second card; and
a trusted user platform for said terminal equipment, the trusted user platform comprising:
an information protection system configured to implement security functionalities, and
a memory configured to store configuration instances for said information protection system, said method comprising:
partitioning said trusted user platform on said terminal security support system between the first card and the second card;
configuring said terminal equipment to send at least one of data received from the network and data to be transmitted over the network to the trusted user platform for security processing;
configuring said terminal equipment to receive security-processed data from the trusted user platform; and
performing, via the information protection system, security processes to protect from attacks against the terminal equipment.

16. The method as claimed in claim 15, wherein said trusted user platform further comprises:
a trusted communication agent configured to provide a safe communication between said terminal security support system and said remote management centre through said terminal equipment,
said method further comprising:
receiving configuration data from said remote management centre; and
using the received configuration data to update at least one configuration instance in said trusted user platform.

17. The method as claimed in claim 15, wherein said first and second cards are an integrated circuit card and a memory card.

18. The method as claimed in claim 17, wherein partitioning said trusted user platform on said terminal security support system between said first and second cards comprises:
arranging said information protection system on said memory card and said configuration instances and said trusted communication agent on said integrated circuit card.

19. The method as claimed in claim 18, wherein partitioning said trusted user platform on said terminal security support system between said first and second cards comprises:
arranging said information protection system and said configuration instances on said memory card and said trusted communication agent on said integrated circuit card.

20. The method as claimed in claim 15, wherein said configuration instances comprise:
configuration parameters, security policies and databases.

21. The method as claimed in claim 15, wherein said information protection system comprises:
a firewall configured to analyze an information flow and, according to configured rules, to allow or deny data packets,
an antivirus configured to detect and protect against viruses based on a specific database of virus footprints, and
an intrusion detection system configured to detect specific attacks based on a pattern database.

22. The method as claimed in claim 21, wherein said configuration instances comprise:
configuration parameters and security policies for said firewall,
configuration parameters and virus-footprints database for said antivirus, and
configuration parameters and attack pattern database for said intrusion detection system.

23. The method as claimed in claim 15, wherein said trusted communication agent is configured to allow said information protection system to receive said configuration instances and updates of said configuration instances from a remote management centre and to send back to said remote management centre event notifications, logs, warnings, or alarms.

24. The method according to claim 17, further comprising:
providing a card link application in one of said integrated circuit card or said memory card to establish and manage a secure logical connection between said integrated circuit card and said memory card through said terminal equipment, and
providing an application programming interface in said terminal equipment to receive and execute commands from said card link application and to cooperate with said card link application to establish said secure logical connection between said integrated circuit card and said memory card through said terminal equipment.

25. The method as claimed in claim 24, wherein said application programming interface is further configured to receive and send responses to said card link application.

26. The method as claimed in claim 24, wherein said card link application is provided in said integrated circuit card.

27. The method as claimed in claim 15, wherein said terminal equipment is a mobile phone, and said first card is a subscriber identity module card.

28. The method as claimed in claim 15, wherein the security functionalities comprise at least one of i) a firewall process configured to analyze an information flow to allow or deny data packets; ii) an antivirus process configured to detect and protect against viruses; and iii) an intrusion detection process configured to detect attacks.

29. An apparatus, comprising:
a terminal security support system insertable in, and configured to cooperate with a terminal equipment, wherein the terminal equipment is configured to receive and send data through a communication network, and wherein the terminal security support system comprises a first card and a second card; and
a trusted user platform being resident on said terminal security support system and being configured to implement security functionalities, the trusted user platform being configured to perform security processes to protect from attacks against the terminal equipment for at least one of data received from the network at the terminal equipment and data to be transmitted over the network by the terminal equipment and being further configured to send the security-processed data to the terminal equipment, wherein the trusted user platform is partitioned between the first card and the second card.

30. The apparatus as claimed in claim 29, wherein the trusted user platform comprises an information protection system configured to implement security functionalities.

31. The apparatus as claimed in claim 30, wherein the information protection system comprises a firewall, an antivirus, and an intrusion detection system.

32. The apparatus as claimed in claim 29, wherein the communication network is a wireless network.

33. The apparatus as claimed in claim 29, wherein the apparatus further comprises the terminal equipment.

34. The apparatus as claimed in claim 29, wherein the security processes comprise at least one of i) a firewall process configured to analyze an information flow to allow or deny data packets; ii) an antivirus process configured to detect and protect against viruses; and iii) an intrusion detection process configured to detect attacks.

* * * * *